US008694036B2

(12) United States Patent
Wei et al.

(10) Patent No.: US 8,694,036 B2
(45) Date of Patent: *Apr. 8, 2014

(54) APPARATUS AND METHOD FOR PROVIDING UPLINK INTERFERENCE COORDINATION IN A RADIO COMMUNICATION SYSTEM

(75) Inventors: Xusheng Wei, Edinburgh (GB); Zhijun Cai, Euless, TX (US); Gordon Peter Young, Shipston-on-Sour (GB)

(73) Assignee: BlackBerry Limited, Waterloo, Ontario (CA)

( * ) Notice: Subject to any disclaimer, the term of this patent is extended or adjusted under 35 U.S.C. 154(b) by 37 days.

This patent is subject to a terminal disclaimer.

(21) Appl. No.: 13/476,376

(22) Filed: May 21, 2012

(65) Prior Publication Data

US 2012/0231741 A1    Sep. 13, 2012

Related U.S. Application Data

(63) Continuation of application No. 11/859,144, filed on Sep. 21, 2007, now Pat. No. 8,200,263.

(51) Int. Cl.
*H04B 15/00* (2006.01)
*H04B 1/00* (2006.01)
*H04B 17/00* (2006.01)

(52) U.S. Cl.
USPC ...................... 455/501; 455/63.1; 455/67.13

(58) Field of Classification Search
USPC ................. 455/452.1, 452.2, 453, 501, 63.1, 455/67.11, 67.13, 69, 114.2, 296
See application file for complete search history.

(56) References Cited

U.S. PATENT DOCUMENTS

| 5,835,946 | A | 11/1998 | Allen et al. |
| 6,253,065 | B1 | 6/2001 | Palmer |
| 6,721,568 | B1 * | 4/2004 | Gustavsson et al. .......... 455/450 |
| 7,047,011 | B1 * | 5/2006 | Wikman ...................... 455/442 |
| 7,136,638 | B2 | 11/2006 | Wacker et al. |
| 7,257,393 | B2 * | 8/2007 | Akiyama et al. ........... 455/414.3 |
| 7,272,118 | B1 | 9/2007 | Yarkosky |
| 8,200,263 | B2 * | 6/2012 | Wei et al. ...................... 455/501 |
| 2003/0100269 | A1 | 5/2003 | Lehtinen et al. |
| 2005/0085254 | A1 | 4/2005 | Chuah et al. |
| 2005/0282500 | A1 | 12/2005 | Wang et al. |
| 2006/0025077 | A1 * | 2/2006 | Haller et al. ................ 455/41.2 |

(Continued)

FOREIGN PATENT DOCUMENTS

WO    91/09474 A1    6/1991
WO    00/30388 A1    5/2000

OTHER PUBLICATIONS

European Search Report issued in EP Application No. 07118920.3, dated Feb. 18, 2008, 7 pages.

(Continued)

*Primary Examiner* — Andrew Wendell
(74) *Attorney, Agent, or Firm* — Fish & Richardson P.C.

(57) ABSTRACT

An apparatus and a method provide for uplink interference coordination in a radio communication system, such as a cellular communication system. Measurements are made at mobile stations associated with uplink-channel interference conditions. Reports are made to the network when a mobile station experiences interference conditions beyond a measurement threshold. If greater than a group-threshold number of mobile stations experience high levels of uplink-channel interference, communication resources are reallocated in compensation for the high interference conditions.

19 Claims, 4 Drawing Sheets

(56) References Cited

U.S. PATENT DOCUMENTS

| | | |
|---|---|---|
| 2006/0258298 A1 | 11/2006 | Kim et al. |
| 2007/0104164 A1* | 5/2007 | Laroia et al. .................. 370/338 |
| 2008/0070510 A1 | 3/2008 | Doppler et al. |
| 2008/0268864 A1 | 10/2008 | Andersson et al. |
| 2009/0017762 A1 | 1/2009 | Jovicic et al. |

OTHER PUBLICATIONS

Communication pursuant to Article 94(3) EPC issued in EP Application No. 07118920.3, dated Oct. 15, 2008, 3 pages.
Communication Under Rule 71(3) EPC issued in EP Application No. 07118920.3, dated Jun. 8, 2009, 27 pages.
Official Action issued in CA Application No. 2,640,105, dated Oct. 11, 2011, 3 pages.
Office Action issued in U.S. Appl. No. 11/859,144 on May 14, 2010; 9 pages.
Office Action issued in U.S. Appl. No. 11/859,144 on Oct. 29, 2010; 9 pages.
Office Action issued in U.S. Appl. No. 11/859,144 on Mar. 29, 2011; 11 pages.
Office Action issued in U.S. Appl. No. 11/859,144 on Jun. 9, 2011; 9 pages.
Notice of Allowance issued in U.S. Appl. No. 11/859,144 on Sep. 29, 2011; 9 pages.
Notice of Allowance issued in U.S. Appl. No. 11/859,144 on Feb. 10, 2012; 8 pages.
Notice of Allowance issued in Canadaina Application No. 2,640,105 on Oct. 22, 2012; 1 page.

* cited by examiner

APPARATUS AND METHOD FOR
PROVIDING UPLINK INTERFERENCE
COORDINATION IN A RADIO
COMMUNICATION SYSTEM

RELATED APPLICATIONS

The present application is a continuation of and claims priority to U.S patent application Ser. No. 11/859,144, filed on Sep. 21, 2007, which is incorporated by reference in its entirety.

The present invention relates generally to interference control in a radio communication system, such as a cellular, or other multi-user, radio communication system. More particularly, the present invention relates to an apparatus and a method for dynamically coordinating uplink channel communications based upon uplink interference conditions. Increased communication throughput is possible by better allocating uplink communication resources that take into account uplink interference communications. And, an improved communication experience is provided by lessening the effects of uplink interference.

BACKGROUND OF THE INVENTION

Cellular communication systems are used by many throughout the world to communicate. Successive generations of cellular communication systems have been developed and deployed with new-generation systems providing for the performance of increasingly data-intensive communication services. Additional communication systems have been developed and deployed that share some of the characteristics of cellular communication systems. Wireless Local Area Networks and WiFi networks, e.g., also provide for multi-user communications by way of radio air interfaces.

A cellular communication system is a bandwidth-constrained system. That is to say, only a limited portion of the electromagnetic spectrum is allocated to a cellular communication system for communications. Other radio communication systems also are generally bandwidth-constrained. Due to the limited bandwidth that is typically available for communications, communication capacity is sometimes constrained by this limitation. When so-limited, efficient utilization of the allocated bandwidth is essential to maximize best the communication capacity of the communication system. And, efforts are regularly made to increase the efficiency by which the allocated bandwidth is utilized.

Recent attention has been directed, for instance, towards interference coordination to facilitate uplink communications, i.e., communications by mobile stations to network parts of a communication system. By providing interference coordination, improved communication throughput is possible. And, also significantly, interference coordination provides for the reduction of interference that is experienced during the performance of a communication service. A participant in such a communication service is provided with an improved communication experience.

Existing schemes that provide interference coordination, however, exhibit various deficiencies. The existing schemes do not adequately take into account the dynamic nature of a cellular communication system and the dynamic nature of the uplink interference. Some schemes utilize a static time domain representation of the uplink interference. For instance, in one scheme, four categories are defined at a cell. A mobile station that operates within the cell is grouped into one of the four categories. A resource allocation strategy is provided by which to allocate the mobile stations to different ones of the resource groups, i.e., categories. In another scheme, efforts are made to avoid uplink interference by allocated frequency resources to mobile stations positioned at cell edges. Information exchange between eNBs has also been proposed to facilitate the allocation of the dedicated frequency resource. At least one mechanism has been proposed that takes into account overload information at an X2 interface. However, in this proposed scheme, the update rate is slow, and variation of distribution of uplink interference is inadequately traced.

Existing proposals, therefore, generally fail properly to take into account a time domain update. And, existing schemes fail to provide properly for uplink interference coordination.

An improved manner by which to provide for uplink interference coordination is therefore needed.

It is in light of this background information related to communications in a radio communication system that the significant improvements of the present invention have evolved.

DETAILED DESCRIPTION

Figure 1A:
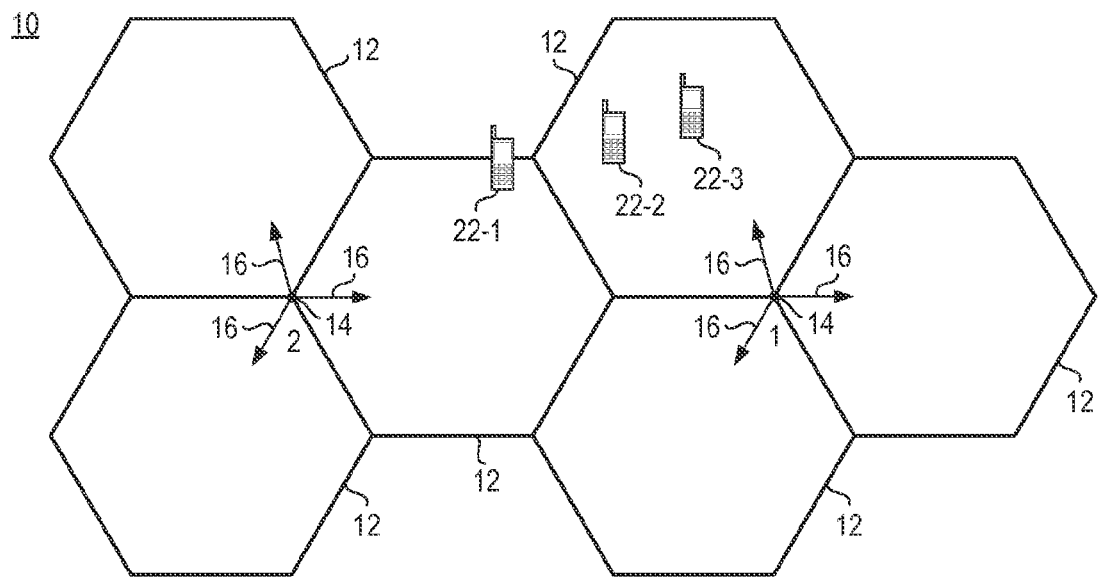
FIGS. 1A and 1B illustrate representations, at two separate time instances, of part of a cellular communication system with exemplary positioning of several mobile stations operable in the communication system.

The present invention, accordingly, advantageously provides an apparatus and a method that facilitates interference control in a radio communication system, such as a cellular, or other multi-user radio communication system.

Through operation of an embodiment of the present invention, a manner is provided by which dynamically to coordinate uplink channel communications in the radio communication system based upon uplink interference conditions.

Operation of an embodiment of the present invention provides for an increase in uplink throughput and also provides for improved communication experience by lessening the perceptible interference during performance of an uplink communication. And, by better coordinating resource allocations by taking into account uplink interference, an improved communication experience is provided.

In one aspect of the present invention, conditions in a cell are monitored to determine the interference conditions throughout, or least at selected locations, in the cell. Monitoring is provided, e.g., by mobile stations that are positioned throughout the cell. Mobile stations positioned at cell-edge boundaries might well be at areas of different uplink interference levels relative to mobile stations positioned farther away from the cell edge boundaries. Communication conditions are, e.g., measured by the mobile stations at selected intervals. Interference-related indicators, such as indicators that are used to determine path loss indications and SINR (Signal to Noise Ratio) indications are amongst the indicators measurable by the mobile stations.

In one embodiment, the eNB is aware of, or is made aware of interference conditions. In one embodiment, the eNB calculates the SINR, path loss, or other indications and determines whether the calculated indications exceed a measurement threshold λ for each of a plurality of mobile stations or whether variation of the calculated indications exceed the measurement threshold. The same, or different, measurement thresholds are used for different ones of the mobile stations.

In another embodiment, the mobile stations generate reports that are reported back to the eNB, or other network entity. Reports are generated, for instance, when the measured indication exceeds a certain level, λ or its variation exceeds a threshold λ. All of the mobile stations, for instance, measure the same indications and compare the measured indications against the same threshold λ. Or, different ones of the mobile stations measure different indications or compare the same measured indications with different thresholds.

In another aspect of the present invention, a count is made of the number of mobile stations whose reports indicate that the measured indications exceed the λ thresholds, or otherwise are indicative of the uplink interference conditions being high. The count, in one implementation, is merely numerical. In another implementation, the count is a normalized count, a proportional count, or otherwise formed as a function of the received indications.

In another aspect of the present invention, the count is compared together with a group threshold value, U. If the counted value is greater than the threshold value U, a decision is made to perform updated interference coordination. The value U is, e.g., proportional to loading conditions in the cell. At higher loading conditions, the value U is higher, requiring a greater count value prior to triggering of performance of interference coordination.

In another aspect of the present invention, a time threshold $t_l$ is also defined. The time threshold is compared with a system time, such as a system time derived from a System Frame Number (SFN). Comparison is made, e.g., through performance of a mathematical operation on the respective values. For instance, a mod $(t_i/t_l)$ operation is performed. When the result is of a zero value, performance of interference coordination is also performed. In one embodiment, the performance of the interference coordination based upon only intra-cell information is carried out. That is to say, the interference coordination does not make use of other eNBs.

In another aspect of the present invention, the frequency bandwidth allocated to a communication system is divided into two groups, a common frequency group and a dedicated frequency group. The common frequency group of frequencies is utilized in each cell of the communication system while the dedicated frequency group is used according to a cell reuse scheme, such as a ⅓ cell reuse scheme. Interference coordination includes the coordination of assignation of the mobile stations to one or the other of the frequency groups. Additional interference coordination parameters include, for instance, power levels at which mobile stations are permitted to communicate, and code or time slot allocations that are permitted to be made to different ones of the mobile stations.

In operation, dynamic allocation and reallocation of communication resources are made based upon measured levels of uplink interference. As communication conditions change, interference coordination procedures are carried out in manners to improve the system communication quality, throughput, or other performance indicia.

In these and other aspects, therefore, an apparatus and a method are provided for facilitating radio-communication-system, uplink interference coordination. A detector is configured to detect radio-communication-system interference condition information. A selector is configured to select update of at least a first interference parameter responsive to the radio-communication-system interference information that is detected to be beyond a first threshold.

Figure 1B:
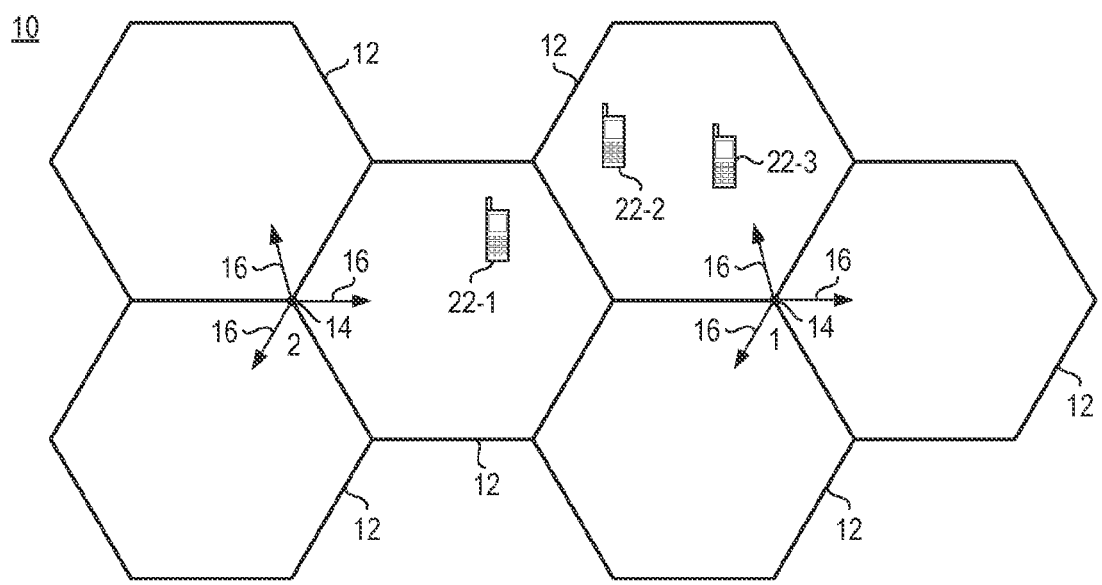

Referring first, therefore, to FIG. 1A, a portion 10 of a cellular communication system is represented. FIG. 1A illustrates the portion of the cellular communication system at a first of two time instances. A first time instance, time 1, is represented in FIG. 1A. And, a second time instance, time 2, is represented in FIG. 1B. Two three-cell clusters, i.e., groups of three cells 12, are represented in each portion. Sector cells are represented, representative of cells defined by sectorized transmission antennas of an eNB (enhanced Node B) 14 of the network infrastructure of the communication system. The eNBs are connected to other network structure (not shown). Two groups of three-cell clusters are shown in which each cluster is associated with, and defined by, the sectorized transmission antennas of the respective eNBs 14. The arrows 16 represent the boresights of the respective sectorized antennas.

Three mobile stations 22 are represented in FIG. 1A. At the first time instance, the mobile stations 22-1 and 22-2 are allocated the same frequency and time resources, and the mobile station 22-3 is allocated frequencies and time resources that are different from those allocated to the mobile stations 22-1 and 22-2.

In the positions represented at the first time instance, the mobile station 22-2 experiences interference from the mobile station 22-1. And, conversely, the mobile station 22-1 experiences interference from the mobile station 22-2 and interferes with communications by and with the mobile station 22-2. The increased level of interference is due to the positioning of the mobile stations 22-1 and 22-2 close to the cell boundaries separated into their respective cells. The mobile station 22-3 does not experience interference for the reason that no mobile stations in the adjacent cell utilize the same frequency and time resources.

At the second time instance shown in FIG. 1B, the mobile stations 221, 22-2, and 22-3 are again shown. Here, the communication allocations have been changed. Specifically, the mobile stations 22-1 and 22-3 are allocated with the same frequency and time resources while the mobile station 22-2 is allocated with a different frequency and time resource. Here, the mobile station 22-2, while still positioned close to the cell boundary, i.e., cell edge, does not experience interference from the mobile station 22-1 as the mobile stations 22-1 and 22-2 utilize different frequency and time resources. The center-cell positioned mobile station 22-3 that is allocated the same frequency and time resources as the mobile station 22-1, instead experiences interference. However, due to uplink power control, the transmit power of the mobile station 22-1 is higher than that of the transmit power of uplink signal sent by the mobile station 22-3. And, as a result, the amount of interference imposed on the mobile station 22-3 from the mobile station 22-1 is larger than the amount of interference imposed upon the mobile station 22-1 by the mobile station 22-3. Interference coordination on the communication uplinks, therefore, would be beneficial. If not provided, user experience on the uplink channels fluctuates within the service area of the cellular communication system.

While not shown separately in FIGS. 1A-B, the different eNBs 14 are interconnected to permit signaling therebetween. Resource allocation information is included in the signaling. This information is also useful for purposes of uplink interference coordination pursuant to an embodiment of the present invention. Uplink interference coordination is also a complement for existing uplink power control schemes as merely adjusting transmission power levels of mobile stations on the uplink channels is insufficient to guarantee optimization of system throughput. By way of an example, if a mobile station operating close to a cell edge uses the same resources, i.e., the same resource block, with another cell-edged positioned mobile station, increasing the transmission power of uplink signals with each of the mobile stations also increases interference experienced by respective mobile stations.

Figure 2:
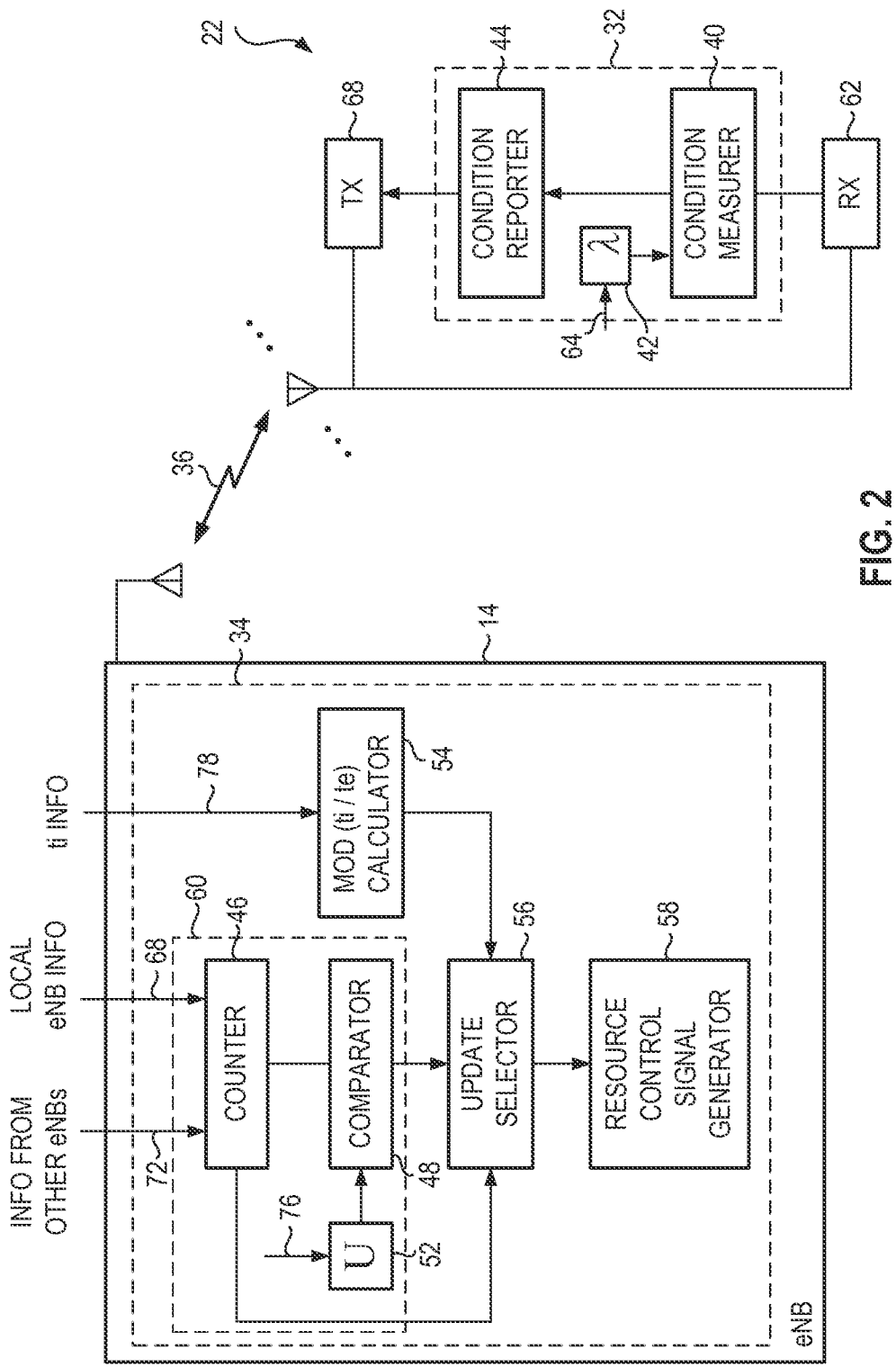
FIG. 2 illustrates a functional block diagram of parts of the cellular communication system shown in FIGS. 1A-B.

FIG. 2 illustrates a functional block diagram of a single mobile station 22 and a single eNB 14, corresponding to a mobile station and eNB shown in FIG. 1. The mobile station and eNB are more generally representative of any mobile station and network entity pair in which interference is experienced during communications therebetween.

The mobile station 22 includes an apparatus 32 of an embodiment of the present invention. And, the eNB 14 includes an apparatus 34 of an embodiment of the present invention. The apparatus 32 and 34 are functionally represented, implementable in any desired manner, including, for instance, by algorithms executable by processing circuitry, hardware components, or combinations of both software and hardware. The apparatus 32 and 34 operate in manners that facilitate interference coordination on an uplink channel defined upon a radio air interface 36 upon which communications are sent by the mobile station to the network entity.

The apparatus 32 is here shown to include a condition measurer 40, a measurement threshold cache 42, and condition reporter 44. And, the apparatus 34 is shown to include a counter 46, a comparator 48, a U threshold cache 52, a calculator 54, and update selector 56, and a resource control signal generator 58. The counter 46, comparator 48, and cache 52 in the exemplary implementation form a detector 60.

In exemplary operation, interference-related condition information is measured by the condition measurer 40 at the mobile station. Average signal-to-noise ratio (SINR) or path loss levels are exemplary of conditions measured by the measurer. Conditions are measured, for instance, through analysis of signals received the receive part (Rx) 62 of the mobile station. Measured conditions are compared together with a measurement threshold value, $\lambda$. The first threshold value is, for instance, a selectable value, such as a value assigned to the mobile station by the network, here indicated to be provided by way of the line 64. The value is provided, e.g, by the network. If the measured conditions exceed the threshold value, indications are provided to a condition reporter 44. The condition reporter generates a report for transmission by the transmit part (Tx) 68 of the mobile station for delivery to the network entity. In an alternate embodiment, and as shall be noted below, certain of the functions of the apparatus 32 are instead performed at the network entity.

Other mobile stations operate analogously, and a plurality of condition reports are communicated to the network entity, representative of interference conditions experienced by the respective mobile stations being beyond a first threshold value, howsoever defined at the different ones of the mobile stations.

In an alternate embodiment, the eNB 14, or other network entity, performs the SINR, path loss, or other calculations and also performs the comparison with the measurement threshold. The functions of elements 40 and 42 of the apparatus 32 are, in this embodiment, carried out at the network.

When delivered to, or calculated at, the eNB 14, the information is provided to the counter 46, here indicated by way of the line 68. The line 68 is representative of locally-supplied information, that is, reported conditions supplied by mobile stations in the cell in which the eNB is associated. A line 72 also extends to the counter. The line 72 is representative of information supplied by other eNBs including, for instance, indications of reports generated in other cells.

The counter operates at least to count the reported conditions provided by way of the line 68. The count is representative, therefore, of the number of mobile stations that report interference conditions beyond the measurement threshold $\lambda$. The count, in one implementation, forms a normalized count or a proportional count that is, in some manner, a function of, or related to, the received number of condition reports. In another implementation, information provided on the line 72 is further utilized.

The count value created by the counter 46 is provided to, and used by, the comparator 48. The comparator compares the count value with a group threshold U. The group threshold U, stored at the memory cache 52, is, in one implementation, selectable, here indicated by way of the line 76. In one implementation, the group threshold value is proportional to the loading in the cell with which the group threshold is associated. Different group thresholds are assigned in different cells, or, alternately, the same group threshold is used over several cells. The comparator compares the count value with the group threshold value and provides an indication to the update selector 56 when the count value is greater than the group threshold value. The update selector is thereby provided with detected information relating to the interference conditions. The update selector may choose, in response thereto, to reallocate communication resources in the cell. Thus, in one embodiment, resources are reallocated on a mobile station-by-mobile station basis for purposes of improving communications in the cell in terms of. e.g., throughput rates or communication quality levels. Reallocated resources are embodied in a resource control signal generated by the generator 58 and sent to the respective mobile stations. Control signals are received by the receive part 62 of the mobile stations. The receive part 62 acts as a detector that detects the control signal. Responsive to the detection, the operation of the mobile station is altered, as needed.

System time information, such as that derived from a system frame number (SFN), is provided, here by way of the line 78 to the calculator 54. Here, the calculator performs a mod $(t_s/t_j)$ calculation. Results from the calculator 54 are also provided to the update selector 56. For example, when the calculation equals zero, an indication is also provided to the update selector 56. The update selector also operates to reallocate communication resources responsive to indications provided by the calculator 54. In one implementation, updates to the allocations, i.e., the reallocations, are made without influence from other cells when the update is selected responsive to the results of the calculations made by the calculator.

Because the communication resource allocations are updated responsive to measured conditions, measured by a plurality of mobile stations or responsive to time indications, dynamic allocation of the communication resources, taking into account the interference conditions on the communication uplinks is provided. Improved communication performance is possible.

In one embodiment, the time threshold, $t_j$ is also selectable. In one embodiment, operation of the calculator 54 causes communication resource allocation to be updated when the results of the calculations are of zero values. For a slow-varied environment, the system time value can be equal to the time threshold value. This parameter gives an operator of the network infrastructure extra freedom to control the implementation rate of the interference coordination, and this parameter need not be forwarded on to the mobile stations. The measurement threshold λ is defined for the mobile stations. Different mobile stations, as noted above, alternately have the same thresholds or have different thresholds. And, the measurement threshold, in one implementation, is a pre-defined percentile. Whenever the variation of the interference conditions, e.g., the average SINR or path loss, exceeds the percentile, the indication is provided to the network, and the mobile station is 'marked' by the network.

The group threshold U is defined for each cell. The group threshold, in one implementation, is identical for several cells, or each cell is provided with a separate group threshold, according to loading in the associated cell. When the number of 'marked' mobile stations exceeds the group threshold, interference coordination is executed by the eNB. Thus, in one embodiment, the system allocates resources based upon aggregate mobile-station-related interference conditions.

Figure 3:
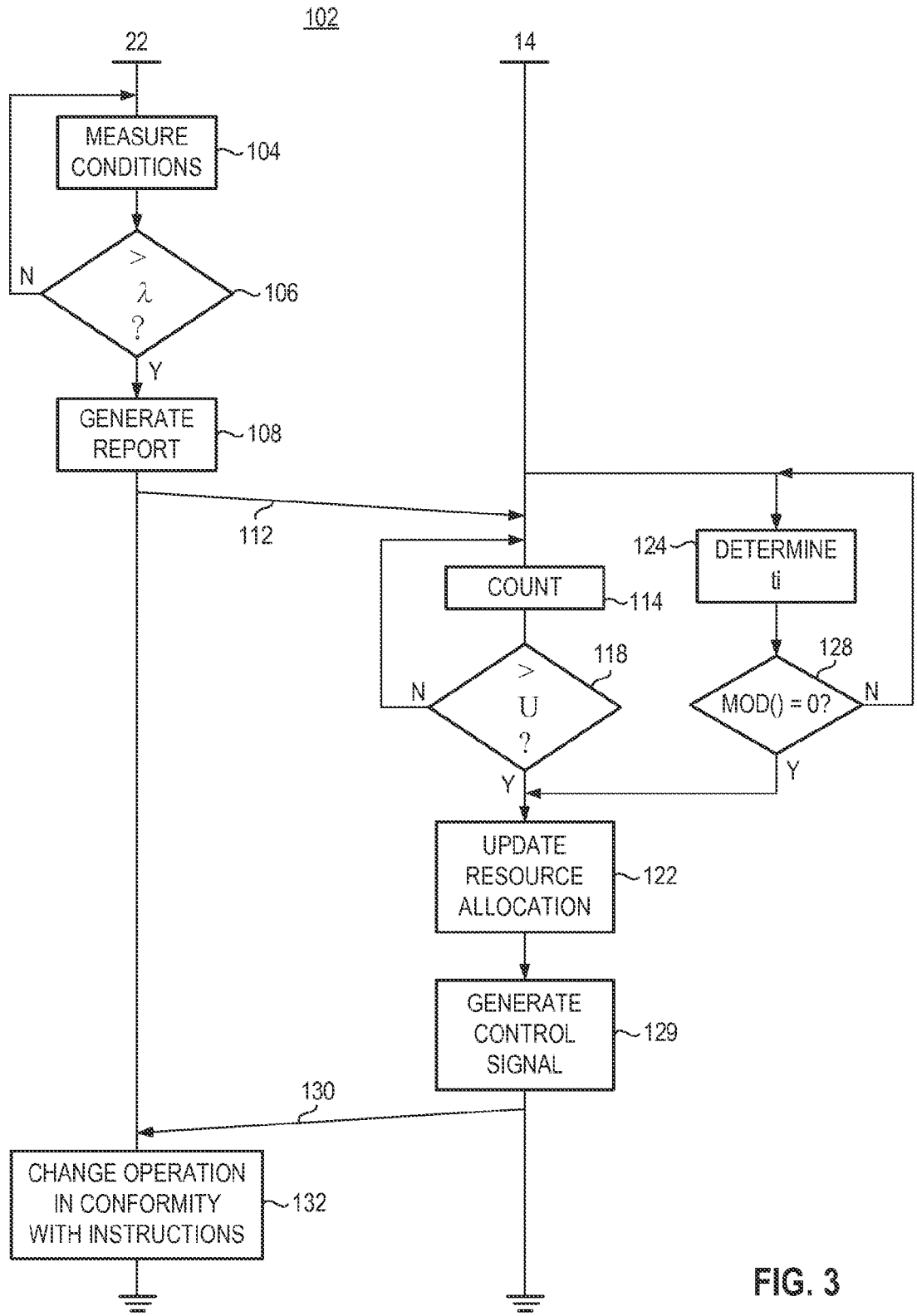
FIG. 3 illustrates a message sequence diagram representative of signaling generated during operation of an embodiment of the present invention.

FIG. 3 illustrates a message sequence diagram, shown generally at 102, representative of signaling generated during operation of an embodiment of the present invention. Here, signaling between a single mobile station 22 and a single eNB 14 is represented. In an actual implementation, multiple mobile stations operate concurrent with operation of the single, mobile station 22 represented in FIG. 3.

First, and as indicated by the block 104, conditions are measured at the mobile station. The measured conditions are associated with uplink interference conditions experienced at the mobile station. A determination is made, indicated by the decision block 106, as to whether the measured conditions are greater than the measurement threshold. If not, the no branch is taken back to the block 104. Otherwise, the yes branch is taken to the block 108, and a report is generated that reports the interference conditions to be beyond the threshold. A report message is sent, indicated by the segment 112, to the eNB.

At the eNB, a count is incremented, indicated by the block 114, of the report. Other reports, generated by other mobile stations, are correspondingly counted. A determination is made, indicated by the decision block 118, as to whether the count value is greater than a group threshold. If not, the no branch is taken back to the block 114. Otherwise, the yes branch is taken to the block 122.

Operating in parallel with the operations 114 and 118, the eNB also monitors a system time, indicated by the determination of $t_i$ block 124. Modulo calculations are performed, and a determination is made, indicated by the block 128, as to whether the modulo calculation is of a zero value. If not, the no branch is taken back to the block 124. Otherwise, the yes branch is taken to the block 122. At the block 122, resource allocations are updated. The updates include, for instance, assignation of mobile stations to a frequency group, either a common frequency group or a non-common dedicated) frequency group, time slot allocations, code allocations, etc. And, once the allocations are updated, a control signal is generated, indicated by the block 129, and sent, indicated by the segment 130, to the mobile stations, here the mobile station 22. And, once detected at the mobile station, operation of the mobile station is changed, if needed, in conformity with the instructions, all as indicated by the block 132.

Figure 4:
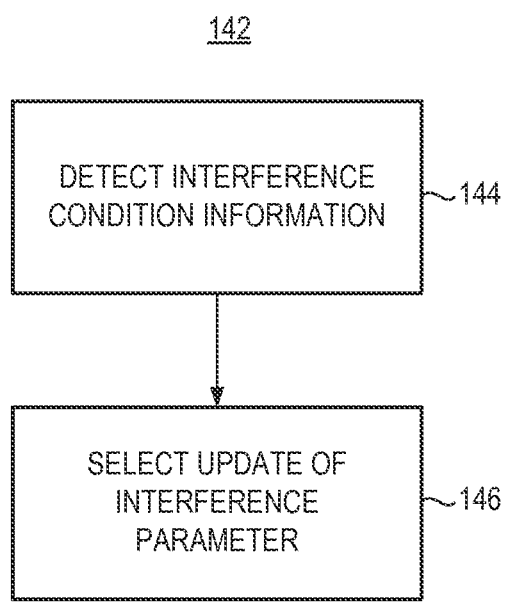
FIG. 4 illustrates a method flow diagram representative of the method of operation of an embodiment of the present invention.

FIG. 4 illustrates a method flow diagram, shown generally at 142, representative of the method of operation of an embodiment of the present invention. The method facilitates radio-communication-system uplink interference coordination.

First, and as indicated by the block 144, radio-communication-system-interference condition information is detected. Then, and as indicated by the block 146, update of at least a first interference parameter is selected if the radio-communication-system information is detected to be beyond a first threshold.

Through operation, therefore, a dynamic manner is provided by which to allocate, and reallocate, communication resources on a communication uplink responsive to changing interference conditions on the communication uplinks.

Presently preferred embodiments of the invention and many of its improvements and advantages have been described with a degree of particularity. The description is of preferred examples of implementing the invention, and the description of preferred examples is not necessarily intended to limit the scope of the invention. The scope of the invention is defined by the following claims.

What is claimed is:

1. A base station of a wireless communications network, the base station facilitating radio-communication-system uplink interference coordination, the base station comprising:
   a detector configured to detect a radio-communication-system interference condition, the detector further configured to calculate an indication value of the radio-communication-system interference condition based on condition reports from mobile devices in a cell of the base station, wherein the condition reports identify inference with uplink transmissions from other mobile devices in the cell; and
   a selector configured to select an update of at least a first parameter responsive to the calculated indication value of the radio-communication-system interference condition determined to be beyond a group threshold value assigned to the cell.

2. The base station of claim 1 wherein the radio-communication-system condition comprises information for determining SINR, Signal To Noise Ratio.

3. The base station of claim 1 wherein the radio-communication-system condition comprises information for determining signal path loss.

4. The base station of claim 1 wherein the radio-communication-system interference condition comprises information for determining an aggregate mobile-station-related interference condition information.

5. The base station of claim 4 wherein the aggregate mobile-station-related interference condition information comprises an aggregate mobile-station number representative of multiple interference conditions within an area.

6. The base station of claim 5 wherein each interference condition of the multiple interference conditions comprises an individual mobile-station interference condition.

7. The base station of claim 5 wherein the first threshold value comprises a threshold number and wherein the selector is configured to select to reallocate communication resources when the aggregate mobile-station number exceeds the threshold number.

8. The base station of claim 1 wherein the first parameter comprises a frequency-related parameter.

9. The base station of claim 8 wherein the frequency parameter comprises a mobile-station assignation to one of a first frequency group and a second frequency group.

10. The base station of claim 9 wherein the first frequency group comprises a common frequency group.

11. The base station of claim 9 wherein the second frequency group comprises a non-common frequency group.

12. The base station of claim 1 wherein the selector is further configured to select an update responsive to a time threshold.

13. A method performed at a base station for facilitating radio-communication-system uplink interference coordination, said method comprising:
- detecting a radio-communication-system interference condition;
- calculating an indication value of the radio-communication-system interference condition based on condition reports from mobile devices in a cell of the base station, wherein the condition reports identify inference with uplink transmissions from other mobile devices in the cell; and
- selecting update of at least a first parameter responsive to the calculated indication value of the radio-communication-system condition determined to be beyond a group threshold value assigned to the cell.

14. The method of claim 13 wherein said detecting comprises detecting an aggregated mobile-station-reported interference condition number.

15. The method of claim 14 wherein said selecting the update comprises selecting the update when the aggregated mobile-station-reported interference condition exceeds the threshold.

16. The method of claim 13 wherein the first parameter comprises a frequency-related parameter.

17. The method of claim 13 further comprising updating the first parameter.

18. The method of claim 17 further comprising performing interference coordination.

19. A base station configured to facilitate radio-communication-system uplink interference coordination, said base station comprising:
- a time calculator configured to calculate a time-related value based on a time threshold and a system time, the time related value associated with communications between the base station and one or more mobile devices; and
- a selector configured to select to update at least a first parameter responsive to when the time-related value is of a selected characteristic, wherein the first parameter controls an implementation rate of interference coordination.

* * * * *

UNITED STATES PATENT AND TRADEMARK OFFICE
CERTIFICATE OF CORRECTION

| | |
|---|---|
| PATENT NO. | : 8,694,036 B2 |
| APPLICATION NO. | : 13/476376 |
| DATED | : April 8, 2014 |
| INVENTOR(S) | : Xusheng Wei, Zhijun Cai and Gordon Peter Young |

It is certified that error appears in the above-identified patent and that said Letters Patent is hereby corrected as shown below:

Title Page, Item (75) (Inventors), In Line 3, Delete "Shipston-on Sour (GB)" and insert -- Shipston-on-Stour (GB) --, therefor.

Title Page 2, In Column 2 (Other Publications), In Line 13, Delete "Canadaina" and insert -- Canadian --, therefor.

Signed and Sealed this
Eighth Day of July, 2014

Michelle K. Lee
*Deputy Director of the United States Patent and Trademark Office*